United States Patent
Kinard et al.

(10) Patent No.: US 6,888,717 B2
(45) Date of Patent: May 3, 2005

(54) WORKING ELECTROLYTE FOR ELECTROLYTIC CAPACITORS

(75) Inventors: John Tony Kinard, Greer, SC (US); Brian John Melody, Greer, SC (US); David Alexander Wheeler, Williamston, SC (US)

(73) Assignee: Kemet Electronics Corporation, Greenville, SC (US)

( * ) Notice: Subject to any disclaimer, the term of this patent is extended or adjusted under 35 U.S.C. 154(b) by 4 days.

(21) Appl. No.: 10/460,920

(22) Filed: Jun. 13, 2003

(65) Prior Publication Data

US 2004/0252444 A1 Dec. 16, 2004

(51) Int. Cl.$^7$ ................................................. H01G 9/00
(52) U.S. Cl. ........................ 361/504; 361/509; 361/516; 361/519; 361/523; 361/525; 361/528; 29/25.03
(58) Field of Search .................................. 361/504, 508, 361/509, 516, 519, 520, 523, 528, 529, 530, 506, 502, 503, 524, 525, 433; 252/62.2

(56) References Cited

U.S. PATENT DOCUMENTS

| | | | | | |
|---|---|---|---|---|---|
| 4,473,864 A | * | 9/1984 | Van Heusden | ............... | 361/327 |
| 4,539,146 A | | 9/1985 | Melody | ...................... | 252/62.2 |
| 4,747,021 A | * | 5/1988 | Morimoto et al. | .......... | 361/505 |
| 6,219,222 B1 | | 4/2001 | Shah et al. | .................. | 361/506 |

* cited by examiner

*Primary Examiner*—Anthony Dinkins
*Assistant Examiner*—Nguyen T. Ha
(74) *Attorney, Agent, or Firm*—Joseph T. Guy; Nexsen Pruet, LLC

(57) ABSTRACT

An electrolyte for a capacitor and capacitor containing the electrolyte. The electrolyte has up to about 85%, by weight, water, up to about 65%, by weight organic solvent and an acid defined by $HOOC-(CH_2)_x-COOH$ wherein x is 3, 5, 7 or 9, and ammonium hydroxide.

45 Claims, No Drawings

WORKING ELECTROLYTE FOR ELECTROLYTIC CAPACITORS

BACKGROUND

The present invention is specific to a working electrolyte for an electrolytic capacitor.

So called "wet" tantalum electrolytic capacitors were first commercially introduced in the form of sintered powder metallurgy slugs of less than theoretical density. The tantalum slugs, which have very large internal surface area, act as the positive capacitor plates in tantalum wet slug capacitors. After an anodizing step, the interstices of each anode slug are coated with an anodic oxide film which acts as the capacitor dielectric. The anodized tantalum slugs are then sealed in cans containing a highly conductive liquid electrolyte solution and having high surface area conductive linings to communicate the current to the liquid electrolyte solution.

The electrolyte solutions used in wet tantalum electrolytic capacitors have traditionally consisted of one of two basic formulations. The first formulation consists of an aqueous solution of lithium chloride. Lithium chloride solutions have the advantage of being relatively non-hazardous to personnel assembling the capacitors and of being non-corrosive to silver cases used in the fabrication of many wet tantalum capacitors, especially those capacitors used under conditions of high ripple current or reverse polarity. Silver is extremely insoluble in near neutral pH chloride solutions. Aqueous lithium.chloride solutions have the disadvantage of being limited to voltages below about 30 volts and have higher resistivity leading to higher device equivalent series resistance or ESR than the second type of electrolyte solution.

The second electrolyte formulation traditionally used in wet tantalum capacitors consists of an aqueous solution of 35–40% sulfuric acid. Aqueous sulfuric acid electrolyte solutions are both hazardous to capacitor assembly personnel and corrosive to capacitor production machinery. The resistivity of aqueous sulfuric acid is very low and, consequently, capacitors containing aqueous sulfuric acid electrolytes exhibit lower ESR than capacitors containing any other aqueous electrolyte solution. Aqueous sulfuric acid may also be used in capacitors rated up to 125 volts at 85° C. Aqueous sulfuric acid also exhibits a relatively small change in resistivity with changing temperature and so, with proper device construction, may be used in capacitors rated for service at −55° C. to 200° C. The low resistivity, wide temperature capability, and relatively high maximum operating voltage have made aqueous sulfuric acid the electrolyte of choice for the vast majority of wet tantalum capacitors manufactured currently.

Efforts have been underway for many years to extend the voltage capability of the liquid electrolyte solutions used in wet tantalum capacitors. Phosphoric acid has been added to the aqueous sulfuric acid in an attempt to raise the electrolyte sparking voltage. The addition of phosphoric acid is accompanied by an increase in resistivity and an increase in the change of resistivity with temperature. The observed increase in sparking voltage is only on the order of 15–25 volts and the negative impact upon resistivity is such that phosphoric acid electrolyte additions are seldom used in commercial devices.

The addition of approximately 1% boric acid to the conventional aqueous sulfuric acid fill or working electrolytes used in wet tantalum electrolytes has been found to increase the sparking voltage of the electrolyte by about 25 volts with little or no effect upon the electrolyte resistivity and device ESR as described in U.S. Pat. No. 4,539,146. More important than the enhanced sparking voltage observed with boric acid additions to sulfuric acid electrolytes is the reduced leakage current associated with these additions. In the case of device failure from shorting/DCL while in service, the presence of boric acid in the electrolyte tends to minimize the leakage current so as to prevent bursting of the capacitor cases from gas generation and electrolyte boiling before circuit shutdown occurs.

The substitution of one or more organic solvents for the aqueous component of the working electrolyte for wet tantalum capacitors to facilitate higher breakdown voltages is hampered by the requirement of low electrolyte resistivity made necessary by the sintered slug construction of wet tantalum capacitors. This is similar for electrolyte solutions used as fill or working electrolytes in aluminum electrolytic capacitors. Organic solvent solutions of certain salts, such as ammonium metatungstate, ammonium thiocyanate or ammonium boro-disalicylate exhibit resistivities as low as approximately 40 ohm-cm at 30° C. Ammonium nitrate solutions in dimethyl formamide may exhibit still lower resistivity. These solutions have been used successfully in low-voltage tantalum foil capacitors, however, the sparking voltages of these solutions are generally well under 100 volts in wet-slug tantalum capacitor applications.

Organic solvent-based electrolyte solutions having sparking or breakdown voltages above the 125–150 volts of aqueous sulfuric acid solutions tend to contain salts of less well ionized organic acids as the main ionogen and exhibit resistivities of hundreds of ohm-cm at 30° C. In order to be of useful service in wet tantalum capacitors, the electrolyte resistivity should be below about 50–60 ohm-cm at 30° C. and the sparking voltage or useful voltage should be significantly above 150 volts.

U.S. Pat. No. 6,219,222 describes a series of electrolytes useful as fill or working electrolytes for wet tantalum capacitors at voltages of 200+working volts (rated voltage). In order to obtain sufficiently low resistivity, the electrolytes of 6,219,222 employ a solvent system that contains about 50% or more water. The ionogens listed in U.S. Pat. No. 6,219,222 include ammonium acetate and ammonium adipate. The organic solvents listed in 6,219,222 include ethylene glycol, 4-butyrolactone, and dimethyl formamide.

Experiments conducted in our laboratory indicate that the inclusion of alkyl monocarboxylic acids in electrolyte solution formulations give rise to electrolytes which exhibit a tendency to grow anodic oxide on tantalum, at any cracks or flaws in the anodic oxide, at significantly below 100% anodizing efficiency. The reduced anodizing efficiency associated with monocarboxylic acids (particularly lower molecular weight monocarboxylic acids) may act as an additional battery drain in battery powered circuits containing wet tantalum capacitors filled with electrolyte solutions containing monocarboxylic acids.

Electrolyte solutions containing ammonium adipate have been found to be very efficient in the growth of anodic oxide on tantalum and fill or working electrolyte solutions containing ammonium adipate tend to be less wasteful of battery life in battery-powered circuits containing wet tantalum capacitors filled with ammonium adipate-containing electrolyte solutions.

Unfortunately, electrolyte solutions is containing a sufficient amount of ammonium adipate to produce desirably low resistivity at 20–40° C. tend to produce ammonium adipate precipitates when cooled below room temperature. If capacitors containing ammonium adipate electrolyte solutions are exposed to low temperatures, e.g. −25° C. or lower, the precipitation of ammonium adipate is such as to require heating to elevated temperature to restore the electrolyte solution to its original composition. The high temperature is required to re-dissolve the ammonium adipate in the solvent of the electrolyte.

What is desired is one or more dicarboxylic acid salts for the high anodizing efficiency associated with these salts in partially organic aqueous solution which have very high solubility in the electrolyte solvent to provide sufficiently low electrolyte solution resistivity. Furthermore, salts are desired which do not precipitate from solution upon cooling to at least −25° C.

SUMMARY OF THE INVENTION

It is an object of the present invention to provide a working electrolyte for a capacitor and a capacitor containing the electrolyte.

It is another object of the present invention to provide an aqueous working electrolyte with high breakdown voltage.

It is yet another object of the present invention to provide an aqueous working electrolyte, and capacitor containing the electrolyte, which can withstand freezing temperatures without detriment to the capacitor or electrolyte.

A particular feature of the present invention is the ability of the electrolyte, or capacitor containing the electrolyte, to withstand temperatures sufficient to freeze the electrolyte yet when returned to temperatures above freezing the electrolyte, or capacitor containing the electrolyte, can be employed without the necessity for reformation charges or heating.

These, and other advantages as will be realized, are provided in an electrolyte for a capacitor. The electrolyte comprises up to about 85%, by weight, water, up to about 65%, by weight organic solvent and an acid defined by HOOC—$(CH_2)_x$—COOH wherein x is 3, 5, 7 or 9, and ammonium hydroxide.

Yet another embodiment is provided in an electrolyte for a capacitor. The electrolyte comprises: up to about 85%, by weight, water; up to about 65%, by weight, organic solvent; and $NH_4OOC$—$(CH_2)_n$—$COONH_4$ wherein x is 3, 5, 7 or 9. The electrolyte is at a pH of about 4 to about 9.

A particularly preferred embodiment is provided in a capacitor. The capacitor comprises an electrolyte comprising: about 30 to about 85%, by weight, water; an organic solvent; an acid defined by HOOC—$(CH_2)_n$—COOH, wherein x is 3, 5, 7 or 9; and ammonium hydroxide. The electrolyte has a pH of about 4 to about 9.

DESCRIPTION OF THE INVENTION

Through diligent research the inventors have discovered an electrolyte which is particularly suitable as a working electrolyte in an electrolytic capacitor. The electrolyte is an aqueous solution comprising organic solvent and the ammonium salt of a dicarboxylic acid. These electrolytes, and the capacitors containing them, can be frozen without detriment to the electrolyte or the capacitor.

It is known that alkyl dicarboxylic acids having an odd number of carbon atoms exhibit greater solubility than alkyl dicarboxylic acids having an even number of carbon atoms. For example, for acids of similar molecular weight, e.g. with 5 vs. 6 carbon atoms or 9 vs. 10 carbon atoms the dicarboxylic acid with an odd number of carbons is more soluble than the even number. We have found that the salts of alkyl dicarboxylic acids having an odd number of carbon atoms also tend to be more soluble than salts of alkyl dicarboxylic acids having an even number of carbon atoms when compared with the same cation.

The electrolyte of the present invention comprises water, organic solvent and the ammonium salt of a compound of Formula I:

HOOC—$(CH_2)_x$—COOH          Formula I wherein x is 3, 5, 7 or 9. More preferably x is 5 or 7 with 7 being most preferred.

The ammonium salt of Formula I may be formed in-situ by addition of the compound of Formula I and ammonium hydroxide to the electrolyte. It is preferred that the molar amount of ammonium hydroxide be at least about 0.9 to about 2.1 times the molar amount of the compound of Formula I. It is more preferred that the molar amount of ammonium hydroxide be at least about 1.9 to about 2.1 times the molar amount of the compound of Formula I. It is most preferably that the molar amount of ammonium hydroxide be about 2 times the molar amount of the compound of Formula I. The ammonium hydroxide and compound of Formula I are preferably added in an amount sufficient to maintain a pH of about 4 to about 9. More preferably, the pH is about 6 to about 8.

The water is present in the electrolyte in an amount of up to about 85%, by weight. Preferably, the water is present in the electrolyte in an amount of at least about 30%, by weight. Most preferably, the water is present in an amount of about 30 to about 70%, by weight.

The organic solvent is preferably present in an amount of up to about 65%, by weight. Preferably, the organic solvent is present in an amount of at least about 15%, by weight. Most preferably, the organic solvent is present in an amount of about 30 to about 65%, by weight.

The organic solvent is selected from diols, N-alkyl substituted amides and lactones. Particularly preferred solvents include ethylene glycol; propylene glycol; 2-methyl, 1,3-propane diol; 4-butyrolactone and dimethyl formamide.

We have found that azelaic acid, the 9-carbon alkyl dicarboxylic acid where X is 7 in Formula 1, may be used to formulate electrolyte solutions which exhibit resistivities of 20–40 ohm-cm at 25–40° C. Capacitors containing azelaic acid, which may be used at voltages significantly above 200 volts, do not form precipitates upon cooling even to the freezing point. The electrolytes may be frozen and returned to room temperature and, upon melting, uniform solutions are obtained which do not contain precipitated solids.

The inventive electrolyte is compatible with components and materials typically employed in electrochemical capacitors. Capacitors comprising a cathode of a conductive metal such as titanium or tantalum with a semiconductive or pseudoconductive coating are particularly preferred. The coating is preferably an oxide but carbides and carbon nitrides are also mentioned. A particularly preferred cathode is a porous ruthenium oxide on a titanium substrate. The anode is a valve metal preferably chosen from vanadium, niobium, and tantalum. Sintered tantalum is the preferred anode. The anode and cathode are physically separated by a separator material the choice of which is not particularly limited herein.

EXAMPLE 1

An ammonium azelate electrolyte solution comprising ethylene glycol and water was prepared similar to those of U.S. Pat. No. 6,219,222. The high sparking or breakdown voltage associated with this solution as would be necessary for use as a high-voltage, wet tantalum capacitor electrolyte was measured. The following solution was prepared:

| | |
|---|---|
| De-ionized water, | 100 grams |
| Ethylene glycol, | 60 grams |
| Ammonium hydroxide (29.3%), | 28 grams |
| Azelaic acid, | 39 grams |
| pH = approximately 7 (Hydrion test paper) | |
| 1 kilohertz resistivity = 21 ohm-cm @ 37° C. | |
| 20 ohm-cm @ 41° C. | |
| 16 ohm-cm @ 50° C. | |

The breakdown voltage of the above electrolyte was tested using a tantalum anode which was pre-anodized to 225 volts at 40° C. (anode fabricated from 1.8 grams of H.C. Starck NH-175 tantalum powder, sintered at 1450° C. for 15 minutes). The anode was suspended in the above electrolyte solution, contained in a stainless steel beaker which also served as the circuit cathode connection. The voltage was applied in a series of steps while the current was monitored. The results were as follows:

| Voltage | Time at Voltage | Leakage Current | Temperature |
|---|---|---|---|
| 50 Volts | 2 minutes | 0.025 milliamperes | 34° C. |
| 100 Volts | 2 minutes | 0.040 milliamperes | 34° C. |
| 150 Volts | 2 minutes | 0.065 milliamperes | 34° C. |
| 175 Volts | 2 minutes | 0.079 milliamperes | 34° C. |
| 200 Volts | 2 minutes | 0.120 milliamperes | 32° C. |
| 200 Volts | 5 minutes | 0.090 milliamperes | 30° C. |
| 200 Volts | 10 minutes | 0.072 milliamperes | 29° C. |
| 200 Volts | 15 minutes | 0.065 milliamperes | 28° C. |
| 210 Volts | 2 minutes | 0.092 milliamperes | 28° C. |
| 210 Volts | 5 minutes | 0.089 milliamperes | 28° C. |
| 220 Volts | 1 minute | 3.3 milliamperes | 28° C. |
| 220 Volts | 2 minutes | 2.6 milliamperes | 28° C. |

Thus the electrolyte of the present invention exhibits acceptably low resistivity and may be employed at very nearly the anodizing voltage at close to the anodizing temperature, i.e., a use voltage of at least 200 volts with an anodizing voltage of 225 volts at similar temperature.

EXAMPLE 2

A non-traditional capacitor was prepared comprising an electrolyte solvent with an alkyl dicarboxylic acid containing an odd number of carbon atoms. The electrolyte solution was prepared comprising:

| | |
|---|---|
| De-ionized water, | 100 grams |
| Propylene glycol, | 60 grams |
| Ammonium hydroxide (29.3%), | 28 grams |
| Azelaic acid, | 39 grams |
| pH = approximately 7 (Hydrion test paper) | |
| 1 kilohertz resistivity = 34 ohm-cm @ 34° C. | |

A 50 ml sample of the above electrolyte solution was placed in a small polyethylene bottle, and the bottle was placed in an environmental chamber and stabilized at a temperature of −35° C. Upon coming to thermal equilibrium with the chamber, the electrolyte solution was found to have frozen solid. The bottle of frozen electrolyte was then removed from the environmental chamber and placed upon a table top in a room at approximately 22° C. Immediately upon observing complete melting of the electrolyte at room temperature, and without agitation, the bottle was opened and the electrolyte was found to be clear and free from precipitation. Thus the electrolytes of the present invention have been found to freeze without solids precipitation so as to be immediately serviceable within capacitors containing them upon returning to room temperature after exposure to temperatures sufficiently cold to result in freezing of the electrolyte. No elevated temperature exposure regime is required to return the capacitors containing the electrolytes of the present invention to service.

The breakdown voltage of the electrolyte solution of this example was tested using an anode from the group of anodized anodes used in Example 1. The electrolyte was contained in a 250 ml Pyrex beaker with a spiral-form cathode of 316 stainless steel against the internal wall of the beaker. The voltage across the anode was increased in a series of steps while the current through the anode was monitored. The results were as follows:

| Voltage | Time at Voltage | Leakage Current | Temperature |
|---|---|---|---|
| 50 Volts | 1 minute | 0.027 milliamperes | 20° C. |
| 50 Volts | 2 minutes | 0.021 milliamperes | 20° C. |
| 100 Volts | 1 minute | 0.046 milliamperes | 20° C. |
| 100 Volts | 2 minutes | 0.034 milliamperes | 20° C. |
| 150 Volts | 1 minute | 0.101 milliamperes | 20° C. |
| 150 Volts | 2 minutes | 0.068 milliamperes | 20° C. |
| 175 Volts | 1 minute | 0.107 milliamperes | 20° C. |
| 175 Volts | 2 minutes | 0.079 milliamperes | 20° C. |
| 200 Volts | 1 minute | 0.147 milliamperes | 20° C. |
| 200 Volts | 2 minutes | 0.110 milliamperes | 20° C. |
| 200 Volts | 7 minutes | 0.075 milliamperes | 20° C. |
| 210 Volts | 1 minute | 0.119 milliamperes | 20° C. |
| 210 Volts | 2 minutes | 0.109 milliamperes | 20° C. |
| 210 Volts | 10 minutes | 0.092 milliamperes | 20° C. |
| 220 Volts | 1 minute | 0.141 milliamperes | 20° C. |
| 220 Volts | 6 minutes | 0.139 milliamperes | 20° C. |
| 225 Volts | 1 minute | 1.4 milliamperes | 20° C. |
| 225 Volts | 5 minutes | 0.75 milliamperes | 20° C. |

Thus the working electrolyte of Example 2 is capable of functioning at very nearly the same voltage stress level applied to the anode during its initial anodizing to 225 volts.

The breakdown voltage of the electrolyte of Example 2 was then measured using the same sample of electrolyte and test equipment, but with a 1.9 gram anode fabricated from H.C. Starck QR-12 tantalum powder sintered at 1938° C. for 30 minutes and anodized to 300 volts at 40° C. in an appropriate electrolyte. The results are as follows:

| Voltage | Time at Voltage | Leakage Current | Temperature |
|---|---|---|---|
| 50 Volts | 1 minute | 0.006 milliamperes | 20° C. |
| 100 Volts | 1 minute | 0.012 milliamperes | 20° C. |
| 150 Volts | 1 minute | 0.018 milliamperes | 20° C. |
| 200 Volts | 1 minute | 0.025 milliamperes | 20° C. |
| 250 Volts | 1 minute | 0.039 milliamperes | 20° C. |
| 250 Volts | 5 minutes | 0.031 milliamperes | 20° C. |
| 276 Volts | 1 minute | 0.047 milliamperes | 20° C. |

Thus, with appropriately anodized anodes, the electrolyte is capable of functioning without catastrophic failure up to at least 250–275 volts.

EXAMPLE 3

In order to further illustrate the utility of alkyl dicarboxylic acids having an odd number of carbon atoms in capacitor electrolytes for high voltage tantalum wet capacitors, the following electrolyte solution was prepared:

| De-ionized water, | 100 grams |
|---|---|
| 2-methyl, 1,3-Propane Diol | 60 grams |
| Ammonium hydroxide (29.3%), | 28 grams |
| Azelaic acid, | 39 grams |
| pH = approximately 7 (Hydrion test paper) | |
| 1 kilohertz resistivity = 32 ohm-cm @ 30° C. | |

The breakdown voltage of the above electrolyte was tested using an anode from the same group of anodes used in Example 1 (225 volts/40° C. anodization prior to testing). The results are as follows:

| Voltage | Time at Voltage | Leakage Current | Temperature |
|---|---|---|---|
| 50 Volts | 1 minute | 0.037 milliamperes | 25° C. |
| 50 Volts | 2 minutes | 0.027 milliamperes | 25° C. |
| 100 Volts | 1 minute | 0.054 milliamperes | 25° C. |
| 100 Volts | 2 minutes | 0.038 milliamperes | 25° C. |
| 150 Volts | 1 minute | 0.094 milliamperes | 25° C. |
| 150 Volts | 2 minutes | 0.063 milliamperes | 25° C. |
| 175 Volts | 1 minute | 0.108 milliamperes | 25° C. |
| 175 Volts | 2 minutes | 0.077 milliamperes | 25° C. |
| 200 Volts | 1 minute | 0.158 milliamperes | 25° C. |
| 200 Volts | 2 minutes | 0.115 milliamperes | 25° C. |
| 200 Volts | 7 minutes | 0.079 milliamperes | 25° C. |
| 210 Volts | 1 minute | 0.119 milliamperes | 25° C. |
| 210 Volts | 4 minutes | 0.106 milliamperes | 25° C. |
| 220 Volts | 1 minute | 0.172 milliamperes | 25° C. |
| 220 Volts | 6 minutes | 0.169 milliamperes | 25° C. |

Thus, with the present solvent (i.e., 2-methyl, 1,3-propane diol) as well as the other solvents, tested above, the azelaic acid solution, exemplary of solutions of alkyl dicarboxylic acids having an odd number of carbons, is capable of functioning as a high voltage electrolyte up to nearly the anodizing voltage of 225 volts of the tantalum anode.

A sample of this electrolyte solution was placed in a polyethylene bottle and the bottle containing the electrolyte was placed in an environmental chamber having cooling capability. The electrolyte sample was cooled to −75° C. resulting in thorough freezing of the sample. The electrolyte solution sample was then removed from the environmental chamber and was allowed to thaw at room temperature without agitation. The sample was observed to thaw from the top, downward. The last remaining frozen material melted in the bottom of the container indicating that the frozen electrolyte occupies less volume (is higher in density) than the liquid electrolyte. This is an important indicator that devices containing this electrolyte solution would be unlikely to be damaged by freezing of the electrolyte. As the electrolyte became fully thawed, no precipitates were found. The electrolyte had the same clear appearance as it did prior to freezing.

The above examples are illustrative of the present invention, but are not meant to be limiting. The employment of lower water content in the electrolyte of the present invention generally results in higher maximum voltage capability while a higher water content generally results in a lower electrolyte solution resistivity. Amine salts of the alkyl dicarboxylic acids having an odd number of carbon atoms give similar results to the ammonium salts (i.e., high breakdown voltage and the absence of precipitation upon freezing/thawing of the electrolyte) but tend to exhibit higher resistivity at comparable concentration and water content. Additives known to those skilled in the art, such as phosphate, borate, dichromate, organic nitro compounds, etc., may be present for the purpose of reducing leakage current, prevention of gas generation, and similar reasons.

Thus the electrolyte of the present invention appear to be well suited to the energy storage device applications of U.S. Pat. No. 6,219,222, but without the low anodizing efficiency associated with monocarboxylic acids (such as acetic acid) or the tendency to form precipitates, associated with dicarboxylic acids having an even number of carbon atoms (such as adipic acid).

The present invention has been described with particular emphasis on the preferred embodiments. It would be apparent that modifications, alterations and other embodiments are enabled by the disclosure which are within the scope of the present invention as set forth in the claims appended hereto.

What is claimed is:

1. An electrolyte for a capacitor comprising: up to about 85%, by weight, water; up to about 65%, by weight organic solvent; an acid consisting essentially of Formula I:

$$\text{HOOC}\text{---}(\text{CH}_2)_x\text{---}\text{COOH} \quad \text{Formula I}$$

wherein x is 3, 5, 7 or 9; and ammonium hydroxide.

2. The electrolyte for a capacitor of claim 1 wherein said electrolyte has a pH of about 4 to amount 9.

3. The electrolyte for a capacitor of claim 2 wherein said electrolyte has a pH of about 6 to about 8.

4. The electrolyte for a capacitor of claim 1 wherein said x is 5 or 7.

5. The electrolyte for a capacitor of claim 4 wherein said x is 7.

6. The electrolyte for a capacitor of claim 1 wherein said water represents at least about 30 to no more than about 70%, by weight, of said electrolyte.

7. The electrolyte for a capacitor of claim 1 wherein said organic solvent represents at least about 30 to no more than about 65%, by weight, of said electrolyte.

8. A capacitor comprising the electrolyte of claim 1.

9. An electrolyte for a capacitor comprising:

up to about 85%, by weight, water;

up to about 65%, by weight, organic solvent;

an acid defined by Formula I:

$$\text{HOOC}\text{---}(\text{CH}_2)_x\text{---}\text{COOH} \quad \text{Formula I}$$

wherein x is 3, 5, 7 or 9; and ammonium hydroxide wherein said ammonium hydroxide is present in a molar amount of at least about 0.9 to no more than about 2.1 times the molar amount of said Formula I.

10. The electrolyte for a capacitor of claim 9 wherein said ammonium hydroxide is present in a molar amount of at least about 1.9 to no more than about 2.1 times the molar amount of said Formula I.

11. An electrolyte for a capacitor comprising:

up to about 85%, by weight, water;

up to about 65%, by weight, organic solvent;

an acid defined by Formula I:

$$\text{HOOC}\text{---}(\text{CH}_2)_x\text{---}\text{COOM} \quad \text{Formula I}$$

wherein x is 3, 5, 7 or 9; and ammonium hydroxide wherein said organic solvent is selected from a diol, a N-alkyl substituted amide and a lacitone.

12. The electrolyte for a capacitor of claim 11 wherein said organic solvent is selected from ethylene glycol; propylene glycol; 2-methyl, 1,3-propane diol; 4-butyrolactone and dimethyl formamide.

13. An electrolyte for a capacitor comprising:

up to about 85%, by weight, water;

up to about 65%, by weight, organic solvent; and $NH_4OOC—(CH_2)_x—COONH_4$ wherein x is 3, 5, 7 or 9; wherein said electrolyte is at a pH of about 4 to about 9.

14. The electrolyte for a capacitor of claim 13 with a pH of about 6 to about 8.

15. The electrolyte for a capacitor of claim 13 wherein said x is 5 or 7.

16. The electrolyte for a capacitor of claim 15 wherein said x is 7.

17. The electrolyte for a capacitor of claim 13 wherein said organic solvent is selected from a dial, a N-alkyl substituted amide and a lactone.

18. The electrolyte for a capacitor of claim 17 wherein said organic solvent is selected from ethylene glycol; propylene glycol; 2-methyl, 1,3-propane diol; 4-butyrolactone and dimethyl formamide.

19. The electrolyte for a capacitor of claim 13 wherein said water represents at least about 30 to about 70%, by weight, of said electrolyte.

20. The electrolyte for a capacitor of claim 13 wherein said organic solvent represents at least about 30 to about 65%, by weight, of said electrolyte.

21. The electrolyte for a capacitor of claim 13 wherein said $NH_4OOC—(CH_2)_x—COONH_4$ is formed in-situ by the reaction of an acid of formula $HOOC—(CH_2)_x—COOH$ and ammonium hydroxide.

22. A capacitor comprising the electrolyte of claim 13.

23. A capacitor comprising an electrolyte wherein said electrolyte comprises:
about 30 to about 85%, by weight, water;
an organic solvent;
an acid defined by Formula I:

$$HOOC—(CH_2)_x—COOH \qquad \text{Formula I}$$

wherein x is 3, 5, 7 or 9; and
ammonium hydroxide; and
wherein said electrolyte has a pH of about 4 to about 9.

24. The capacitor of claim 23 with a pH of about 6 to about 8.

25. The capacitor of claim 23 wherein said 4 is 5 or 7.

26. The capacitor of claim 25 wherein said x is 7.

27. The capacitor of claim 23 comprising about 15 to about 65%, by weight, said organic solvent.

28. The capacitor of claim 23 comprising about 30 to about 65%, by weight, said water.

29. A capacitor comprising an electrolyte wherein said electrolyte comprises:
about 30 to about 85%, by weight, water;
an organic solvent;
an acid defined by Formula I:

$$HOOC—(CH_2)_x—COOH \qquad \text{Formula I}$$

wherein x is 3, 5, 7 or 9; and
ammonium hydroxide; and
wherein said electrolyte has a pH of about 4 to about 9 wherein said ammonium hydroxide is present in a molar amount of at least about 0.9 to no more than about 2.1 times the molar amount of said Formula I.

30. The capacitor of claim 29 wherein said ammonium hydroxide is present in an molar amount of at least about 1.9 to no more than about 2.1 times the molar amount of said Formula I.

31. A capacitor comprising an electrolyte wherein said electrolyte comprises:
about 30 to about 85%, by weight, water;
an organic solvent;
an acid defined by Formula I:

$$HOOC—(CH_2)_x—COOH \qquad \text{Formula I}$$

wherein x is 3, 5, 7 or 9; and
ammonium hydroxide; and
wherein said electrolyte has a pH of about 4 to about 9 wherein said organic solvent is selected from a diol, a N-alkyl substituted amide and a lactone.

32. The capacitor of claim 31 wherein said organic solvent is selected from ethylene glycol; propylene glycol; 2-methyl, 1,3-propane diol; 4-butyrolactone and dimethyl formamide.

33. An electrolyte for a capacitor comprising:
up to about 85%, by weight, water;
up to about 65%, by weight organic solvent;
an acid defined by Formula I:

$$HOOC—(CH_2)_x—COOH \qquad \text{Formula I}$$

wherein x is 3, 5, 7 or 9; and
ammonium hydroxide; wherein said electrolyte does not expand upon freezing and no precipitate remains upon thawing.

34. The electrolyte for a capacitor of claim 33 wherein said electrolyte has a pH of about 4 to about 9.

35. The electrolyte for a capacitor of claim 34 wherein said electrolyte has a pH of about 6 to about 8.

36. The electrolyte for a capacitor of claim 33 wherein said x is 5 or 7.

37. The electrolyte for a capacitor of claim 36 wherein said x is 7.

38. The electrolyte for a capacitor of claim 33 wherein said ammonium hydroxide is present in a molar amount of at least about 0.9 to no more than about 2.1 times the molar amount of said Formula I.

39. The electrolyte for a capacitor of claim 38 wherein said ammonium hydroxide is present in a molar amount of at least about 1.9 to no more than about 2.1 times the molar amount of said Formula I.

40. The electrolyte for a capacitor of claim 33 wherein said organic solvent is selected from a diol, a N-alkyl substituted amide and a lactone.

41. The electrolyte for a capacitor of claim 40 wherein said organic solvent is selected from ethylene glycol; propylene glycol; 2-methyl, 1,3-propane diol; 4-butyrolactone and dimethyl formamide.

42. The electrolyte for a capacitor of claim 33 wherein said water represents at least about 30 to no more than about 70%, by weight, of said electrolyte.

43. The electrolyte for a capacitor of claim 33 wherein said organic solvent represents at least about 30 to no more than about 65%, by weight, of said electrolyte.

44. A capacitor comprising the electrolyte of claim 33.

45. An electrolyte for a capacitor comprising:
from 30% up to about 85%, by weight, water; up to about 65%, by weight organic solvent; a compound defined by Formula I:

$$ROOC—(CH_2)_x—COOR \qquad \text{Formula I}$$

wherein R is selected from $H^+$ and $NH_4^+$;
wherein x is 3, 5, 7 or 9;
wherein said electrolyte is at a pH Qf about 4 to about 9; and
said electrolyte does not contain benzoic acid.

* * * * *